United States Patent Office 3,361,617
Patented Jan. 2, 1968

3,361,617
TIRE CORD BONDING WITH AMINOPLAST RESINS AND BUTADIENE/VINYLPYRIDINE LATEX
Samuel Kaizerman, Plainfield, N.J., assignor to American Cyanamid Company, Stamford, Conn., a corporation of Maine
No Drawing. Filed June 6, 1962, Ser. No. 200,337
The portion of the term of the patent subsequent to Oct. 18, 1982, has been disclaimed
18 Claims. (Cl. 161—247)

This invention relates to the manufacture of cord-reinforced, sulfur-vulcanized rubber goods. More particularly, it is concerned with improving the cord to rubber bond. As such, it contemplates an improved adhesive composition for bonding reinforcing cords to rubber, to reinforcing cords treated with the adhesive composition and to a rubber article having a cord bonded therein by means of the adhesive.

In making cord-reinforced vulcanized rubber products, for example, vehicle tires, strength under tension is a critical factor. In many cases it is found that the bond between the cord and the rubber is the point at which failure occurs. In the past, a number of proposals have been made to improve the bond. Some have been widely used. For example, when cotton cords are satisfactory, natural rubber latex may be used quite successfully as the bonding adhesive.

Cotton itself, however, is not as strong as is often desired for many reinforcing uses. With the development of stronger synthetic fiber cords, their advantage in reinforcing tires and the like led to their being tried for this purpose. Unfortunately, when attempts were made to substitute synthetic fiber cords, such as rayons, nylons, Orlons and the like, it was found that very poor adhesion is obtained with natural and synthetic rubbers unless the cord is pretreated with special adhesive compositions.

Various compounding agents, such as casein and resins, like phenol-formaldehyde and resorcinol-formaldehyde reaction products, have been added to the natural rubber latex. Other resinous adhesives, such as heat-setting melamine-formaldehyde condensation products, have been suggested. It was found also that further improvement can be obtained if the resinous material is combined with a rubber latex in preparing the bonding agent.

Nevertheless, with all the improvements thus obtainable, for many purposes the cord-to-rubber bond still is not wholly satisfactory. If a method were available which could further improve this bond, it would be highly useful. Particularly is this true in the manufacture of rubber tires where both the strength of the cord and the bonding of the cord to the rubber are critical for the safety of the passengers.

It is, therefore, a principal object of the present invention to supply this demand for improved bonding compositions and for methods of making and using them. Since tire manufacture illustrates the typical problems, it will be used as illustrative for purposes of this discussion.

In accordance with the present invention, this object has been accomplished to a surprisingly successful degree by using a novel cord-treating composition comprising: (a) a heat-curable aminoplast resin and (b) a suitable rubber latex. In my copending application Ser. No. 193,860, filed May 10, 1962 now Patent No. 3,212,955, it is shown that marked improvement may be produced using combinations of polymethylolmelamine resins and latices of styrene-butadiene copolymer rubbers, hereinafter abbreviated as SBR. The particular feature of the present improvement is in the use of copolymer rubbers of butadiene and vinylpyridine, hereinafter abbreviated as BVP.

The improved adhesives of the present invention may be used for bonding reinforcing cords or fabrics to natural rubbers, synthetic rubbers, reclaimed rubbers and various blends of the same. Obtaining such a result is particularly surprising in view of the fact that somewhat similar combinations of a rubber latex and other heat-setting resins such as phenol-formaldehyde resins have been previously proposed and found to be not completely satisfactory.

In major part, success in the present invention is due not only to the use of specific latices, but also to the use of a wholly different type of resin. In general, they may be designated as heat-curable aminoplast resins. Typical examples include urea-formaldehyde resins, dimethylolethylene urea, polymethylolmelamines and the like. The preferred types are polymethylolmelamines and dimethylolethylene urea. These are not new materials per se, being prepared by known methods and commercially available. For example, some two to six mols of formaldehyde may be reacted with one mol of melamine to form a condensation product. If so desired, this product is then reacted with some two to six mols of a lower alcohol, whereby an etherified polymethylolmelamine is formed. The graphic structure of a heat-curable methylolated urea compound is as follows:

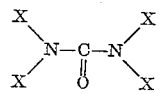

wherein X is hydrogen, hydroxymethyl or methylated hydroxymethyl, at least two of the X radicals being other than hydrogen. Likewise, the graphic structure of dimethylolethylene urea is as follows:

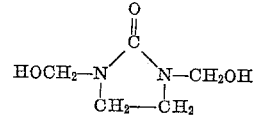

In the present invention, the resin is preferably employed as an aqueous solution. Products which are too highly polymerized tend to be difficultly soluble in water. Accordingly, excessive polymerization should be avoided.

Typical etherified polymethylolmelamines and their manufacture have been described in many U.S. patents including U.S. Patents Nos. 2,329,622 and 2,339,203. They have developed extensive use in the textile resin field. Among the available etherified polymethylolmelamines which are suitable for use in the present invention are the dimethyl and trimethyl ethers of trimethylolmelamine; the dimethyl and trimethyl ethers of pentamethylolmelamine; the hexamethyl ether of hexamethylolmelamine, and the like.

However, the present invention, as noted above, is characterized by the use of a BVP—SBR latex as a cord-bonding adhesive, particularly in the manufacture of tires using various synthetic rubbers. BVP latices are well known per se, e.g., being described in U.S. Patents 2,561,215 and 2,615,826. These patents in particular show the use of BVP and phenol-formaldehyde resins in improving the bond of cord to rubber.

In general, the SBR latices used in the present invention are commercially-available products of the same type used in my above-noted copending application. They are available in a wide variety of 1,3-butadiene:styrene proportions and in rubber solids content. Those which are generally suitable have diene:styrene weight ratios of from about 19:1 to about 1:1; from about 6:1 to about 1.2:1 being found a good practice and to be generally preferable. Industrially-available products often, but not necessarily, contain some one to three percent of an antioxidant, usually of the staining type. Herein the term "rubber solids" includes the antioxidant if one is present.

Suitable BVP latices are also commercially available in wide variety. Generally they comprise copolymers of 1,3-butadiene and 2-vinylpyridine but other dienes and pyridines may be used. The vinylpyridine content may vary from as little as five to as high as eighty weight percent. Both extremes, however are usually prepared for special usages. For purposes of the present invention the vinylpyridine content should range from about ten to about forty percent with from about fifteen to about twenty-five percent constituting good practice and being preferred.

In the latices of the present invention the combined SBR—BVP rubber solids content should contain at least five percent BVP. The preferred content is from about ten to about fifty weight percent. More can be used if so desired but there is no particular advantage in so doing. In fact, BVP rubber may be used alone, if so desired. However, this latter practice is not considered preferable in the present invention, however, since the effectiveness of BVP alone is not as high as for the combined use with SBR.

Latices are commercially available containing from about twenty up to about sixty percent solids. It is desirable to procure or prepare latices of higher solids content than desired in the final formulation since in making up the latter addition of water is much easier than is reduction of water content. Accordingly, for purposes of the present invention the latex preferably should contain from about forty to about sixty percent rubber solids.

In general, the proportions of latex to resin may be varied quite widely. Improved bonding is obtainable using adhesive compositions in which the rubber:resin weight ratio varies from about 1:2 to about 25:1. However, in most cases, these limits may be narrowed to from about 1:1 to about 10:1.

Combining of the resin latex into the adhesive composition of this invention is readily carried out. The rubber content of the available latex is known, as is the concentration of the resin in its solution. Sufficient water is added to a volume of the latex to provide the desired final water content and the resin solution is stirred in. Agitation during mixing should be sufficiently thorough to insure substantially uniform conditions in the finished composition. A terminal rubber solids content of some 5-25 weight percent of composition is found to comprise a good practice.

In general, the aminoplast to be used should be placed in aqueous solution before being combined with the latex. Since these resins are quite water-soluble, no special aids or precautions are necessary. However, the dissolved solids content is preferably below about 50%.

It is an advantage of this invention that no special limitations are imposed on the reinforcing cords. Cords and fabrics which may be bonded to rubber in accordance with the present invention may be of any of the various types and sizes of cord or fabric currently in use for this purpose. The invention is particularly suited to the bonding of viscose rayon cords and fabrics, but is not limited to this material, being also useful for cotton, nylon and the like.

As to the amount of adhesive which should be employed, the optimum will depend on the intended vulcanized product. It is most easily defined as weight percent of the weight of the cord after drying. In general, it may vary from as little as one percent to as high as about twenty. A good practice in most cases will be found in the use of from about three to about fifteen percent.

Another advantage of the invention is in the fact that no special precautions or unusual apparatus is required. The adhesive, in the form of an aqueous solution or emulsion is applied to the cord or fabric by dipping or by any other convenient conventional method for saturating the cord. Excess liquid then is removed in conventional manner by pressure rolls or their equivalent. Thereafter, treated cord or fabric is dried, at a temperature between 100° and 200° C., usually from about one-half to about thirty minutes. Cords and fabrics thus treated with the adhesive are then bonded to the rubber base stock by vulcanization.

The invention will be more fully described in conjunction with the following illustrative examples. Therein, unless otherwise noted, all parts and percentages are by weight and temperatures are indicated in degrees centigrade.

In the following examples a rubber tire carcass test stock is used. It contains natural rubber, butadiene-styrene rubber (SBR) and reclaimed rubber ("whole tire reclaim"). This stock has the following composition:

| Component: | Parts (by weight) |
|---|---|
| Natural rubber | 40 |
| SBR 1006 [1] | 40 |
| Whole tire reclaim | 40 |
| Light process oil | 6 |
| Stearic acid | 1 |
| Zinc oxide | 3 |
| 2,2'-methylenebis(4 - methyl - 6 - tert. butylphenol) | 1 |
| FEF [2] carbon black | 35 |
| Sulfur | 2 |
| Accelerator [3] | 1.4 |

[1] Contains 23.5% of bound styrene and a small amount of antioxidant.
[2] Fast extruding furnace.
[3] N-oxydiethylenebenzothiazole-2-sulfenamide (90%) plus a small amount (10%) of 2-mercaptobenzothiazole.

A test BVP latex also is used. It is a commercially purchased latex, the copolymer having a butadiene/vinylpyridine weight ratio of about 85:15 and contains about 40% rubber solids and 60% water. A test latex of SBR rubber also is used. It has a rubber solids content of about 60% and the butadiene:styrene weight ratio is about 75:25.

Strength of the rubber-to-cord bond is evaluated by measuring the average force required to pull a specified number of cords from the rubber substrate. In the examples, an Instron model TM tensile-strength tester was used, the cross-head speed being two inches per minute and the cords and rubber base stock are pulled in the same plane.

*Example 1*

Untreated viscose rayon tire cord of approximately 3300 denier is laid in parallel rows across the surface of a sheet of the tire carcass test stock in a preheated 6" x 6" x 0.075" mold in such fashion that the parallel cords were spaced at ⅛" to ¼" apart. The rubber tire stock was then vulcanized under pressure for 30 minutes at 144.5° C. By the above-noted test, the force required to separate eight cords from the substrate is four pounds.

*Example 2*

To illustrate the use of an SBR latex and polymethylolmelamine in accordance with my above-noted copending application; to 61.7 parts of water is added 18 parts of the test SBR latex and twenty parts of a 10% aqueous solution of the trimethyl ether of trimethylolmelamine. The tire cord of Example 1 is saturated with the resultant solution by dipping; passed through squeeze rolls to expel the excess solution; air dried in an extended condition; and finally heated for one minute at about 177° C. in a circulating air oven. So-treated cord, containing about 6% adhesive solids on the weight of the cord, are vulcanized with the test tire carcass stock as in Example 1. The force required to separate eight cords is twelve pounds as compared with the four pounds for untreated cord.

*Example 3*

The procedure of Example 2 is repeated but reducing the 18 parts of SBR test latex to 13.3 parts and adding 5 parts of the BVP test latex. The resin solution is replaced by 10% aqueous solution of methylolated urea (urea/formaldehyde ratio=1/1.4). The force required to separate eight cords is found to be unexpectedly increased to 16 pounds.

Example 4

The procedure of Example 2 is repeated but using the combined SBR—BVP latex of Example 3. By use of the combined latex, the force required to separate eight cords is found to be 25 pounds, an increase of over 200 percent over the 12 pounds of Example 2.

Example 5

Repeating the procedure of Example 4 but replacing the trimethylolmelamine ether with an equal weight of the hexamethyl ether of hexamethylolmelamine the force required to separate eight cords is found to be 26 pounds.

Example 6

Repeating the procedure of Example 4 but substituting for the resin solution an equal weight of dimethylolethylene urea as a 10% solution, the force required to separate eight cords is 24 pounds.

Nylon tire cord has many desirable properties. However, it is even more difficult to effectively bond to rubber than the rayon cord of the preceding examples. That it may be effectively bonded in the practice of the present invention is well illustrated in the following examples.

Example 7

To 59.2 parts of water is added 8.3 parts of the SBR test latex, 12.5 parts of the BVP test latex and 20 parts of a 10% solution of the trimethyl ether of trimethylolmelamine. Nylon tire cord is saturated with the resultant solution, passed through squeeze rolls to expel the excess solution and dried. Both treated and untreated cord is then bonded with the rubber tire carcass test stock as in Example 1. The average force required to separate eight treated cords from the rubber substrate is 7.0 pounds; for eight untreated cords only 2.1 pounds.

Example 8

Two test solutions are prepared according to the procedure of Example 2. The first is prepared by adding 26.7 parts of the test SBR latex and 40 parts of a 10% aqueous solution of the trimethyl ether of trimethylolmelamine to 33.3 parts of water; the second, by adding 13.3 parts of the test SBR latex, 20 parts of the test BVP latex and 40 parts of a 10% aqueous solution of the trimethyl ether of trimethylolmelamine to 26.7 parts of water. Nylon cord is saturated with both solutions; reduced to a content of 8% adhesive solids by passage through squeeze rolls; air dried and finally heated for about two minutes at about 177° C. in a circulating air oven. So-treated cords are bonded to the rubber test stock as in Example 1. Cords treated with the first test solution required an average force to separate eight cords of 4 pounds; those with the second solution, 6.1 pounds.

Example 9

The procedure of Example 8 is repeated to obtain two comparable solutions: the first, by adding 16.7 parts of the test SBR latex and 20 parts of a 10% aqueous solution of dimethylolethylene urea to 63.3 parts of water; the second, by adding 13.3 parts of the test SBR latex, 5 parts of the test BVP latex and 20 parts of a 10% aqueous solution of dimethylolethylene urea to 61.7 parts of water. Viscose rayon cord of Example 8 is treated therewith to produce an adhesive solids content of 5% after drying. So-treated cords are bonded to rubber as in Example 1. The average force required to separate eight cords treated with the first solution is 5.7 pounds, a good result. However, the cords treated with the second solution, that of the present invention, required 10.5 pounds.

Example 10

A test solution is prepared as in Example 2 using 437.2 parts of water, 200 parts of the SBR test latex, 48.8 parts of the BVP test latex and 160 parts of a 10% solution of the trimethyl ether of trimethylolmelamine. Viscose rayon cord is treated therewith to an adhesive solids content of 8% and bonded to the test stock as in Example 2. The average force required to separate eight cords is 22 pounds.

As was discussed above, it has previously been proposed to use other resins, such as phenol-formaldehyde or resorcinol-formaldehyde condensation products, in combination with latices of natural and/or synthetic rubber to obtain cord-bonding compositions. However, it was also noted that the results, while improved over previous practices, were still not completely satisfactory. In order to illustrate the fact that the specific latex-resin combinations of the present invention, not merely the use of selected latices with any resin, is responsible for the unexpected improvement, the following comparative example is given.

Example 11

A test resin is prepared by combining in 238.5 parts of water, 11 parts of resorcinol, 16.2 parts of 37% aqueous formaldehyde and 0.3 part of sodium hydroxide. The resultant solution is allowed to stand for six hours at ambient temperature. A test adhesive composition is prepared by substituting 260 parts of the resulting resin solution for the resin solution of Example 10 in repeating the procedure of that example. The average force required to separate eight cords from the cured rubber is only 10.5 pounds.

I claim:

1. In a composite unitary structure comprising at least one textile fiber material surface; at least one vulcanized rubber surface; and an interposed layer unitarily bonded to said textile material surface and to said vulcanized rubber surface; the improvement wherein said interposed layer is a heat-cured composition consisting essentially of (a) heat-curable aminoplast resin solids, and
(b) a heat-curable rubber solids mixture;

said rubber solids mixture consisting essentially of a mixture of butadiene-styrene and butadiene-vinylpyridine copolymer rubbers, the vinylpyridine copolymer content being at least about five percent; and the weight ratio of rubber solids to resin solids being in the range of from about 1:2 to about 25:1.

2. A unitary structure according to claim 1 in which said resin is a heat-curable etherified polymethylolmelamine of the formula $$\begin{array}{c} X \\ X \end{array} N - C \begin{array}{c} N \\ \| \\ N \end{array} C - N \begin{array}{c} X \\ X \end{array}$$

$$\begin{array}{c} C \\ | \\ N \\ X \end{array} X$$

in which each (X) is selected from the group consisting of hydrogen, hydroxymethyl and methoxymethyl, at least two (X's) being methoxymethyl.

3. A composite structure according to claim 1 in which the resin is the trimethyl ether of trimethylolmelamine.

4. A composite structure according to claim 1 in which the resin is the hexamethyl ether of hexamethylolmelamine.

5. A unitary structure according to claim 1 in which said resin is dimethylolethylene urea.

6. A unitary structure according to claim 1 in which said resin is methylolated urea.

7. An aqueous adhesive suspension consisting of (a) a mixed rubber solids latex of unvulcanized vulcanizable styrene-butadiene rubber and butadiene-vinylpyridine copolymer rubber, the butadiene-vinylpyridine comprising at least 5% of the rubber solids; and (b) an aqueous solution of an uncured, heat-curable aminoplast resin solids; said rubber solids comprising from about five to about twenty-five weight percent of the composition and said rubber solids and said resin solids being present in a weight ratio in the range of from about 1:2 to about 25:1.

8. An adhesive suspension according to claim 7 in which the resin is the trimethyl ether of trimethylolmelamine.

9. An adhesive suspension according to claim 7 in which the resin is the hexamethyl ether of hexamethylolmelamine.

10. An adhesive suspension according to claim 7 in which the resin is dimethylolethylene urea.

11. A rubber reinforcing material comprising essentially a textile fabric material carrying from about three to about fifteen weight percent of residual solids retained from a dried adhesive composition, said composition consisting of (a) a mixed rubber solids latex of unvulcanized vulcanizable styrene-butadiene rubber and butadiene-vinylpyridine copolymer rubber, the butadiene-vinylpyridine comprising at least 5% of the rubber solids; and (b) an aqueous solution of an uncured, heat-curable aminoplast resin solids; said rubber solids comprising from about five to about twenty-five weight percent of the composition and said rubber solids and said resin being present in a weight ratio in the range of from about 1:2 to about 25:1.

12. A reinforcing material according to claim 11 in which the resin is the trimethyl ether of trimethylolmelamine.

13. A reinforcing material according to claim 11 in which the resin is the hexamethyl ether of hexamethylolmelamine.

14. A reinforcing material according to claim 11 in which the resin is dimethylolethylene urea.

15. A method of improving the bond between vulcanized rubber and reinforcing textile material which comprises depositing on said reinforcing material from about 3 to about fifteen weight percent of said material of solids from an adhesive composition consisting essentially of (a) a mixed rubber solids latex of unvulcanized vulcanizable SBR and butadiene-vinylpyridine copolymer rubber, the butadiene-vinylpyridine comprising at least 5% of the rubber solids; and (b) an aqueous solution of an uncured, heat-curable aminoplast resin solids; said rubber solids comprising from about five to about twenty-five weight percent of the composition and said rubber solids and said resin being present in a weight ratio in the range of from about 1:2 to about 25:1; compositing so-treated textile material and unvulcanized rubber into the desired physical form and vulcanizing the rubber in said composite.

16. A method according to claim 15 in which the resin is the trimethyl ether of trimethylolmelamine.

17. A method according to claim 15 in which the resin is the hexamethyl ether of hexamethylolmelamine.

18. A method according to claim 15 in which the resin is dimethylolethylene urea.

References Cited

UNITED STATES PATENTS

| | | | |
|---|---|---|---|
| 2,500,517 | 3/1950 | Carswell | 160—45.2 |
| 2,615,826 | 10/1952 | Mallory | 57—153 |
| 2,748,049 | 5/1956 | Kalafus | 161—227 |
| 3,212,955 | 10/1965 | Kaizerman | 161—88 |

ROBERT F. BURNETT, *Primary Examiner.*

EARL M. BERGERT, ALEXANDER WYMAN,
*Examiners.*

G. MORRIS, *Assistant Examiner.*